United States Patent
Kwon et al.

(10) Patent No.: US 9,357,399 B2
(45) Date of Patent: May 31, 2016

(54) MOBILE SYSTEM AND BASE STATION SYSTEM FOR EFFECTIVELY USING LICENSED SPECTRUM AND SHARED SPECTRUM

(75) Inventors: Tae Soo Kwon, Hwaseong-si (KR); Kyung Hun Jang, Suwon-si (KR); In Sun Lee, Seongnam-si (KR); Youngsoo Kim, Seoul (KR); Hyo Sun Hwang, Seoul (KR); Tae In Hyon, Hwasung-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1381 days.

(21) Appl. No.: 12/116,438

(22) Filed: May 7, 2008

(65) Prior Publication Data
US 2009/0209265 A1 Aug. 20, 2009

(30) Foreign Application Priority Data
Feb. 18, 2008 (KR) .................. 10-2008-0014615

(51) Int. Cl.
*H04W 72/00* (2009.01)
*H04W 16/14* (2009.01)
(Continued)

(52) U.S. Cl.
CPC .............. *H04W 16/14* (2013.01); *H04W 24/02* (2013.01); *H04W 72/082* (2013.01); *H04W 88/10* (2013.01); *Y02B 60/50* (2013.01)

(58) Field of Classification Search
CPC ..... H04W 16/14; H04W 72/04; H04W 24/00; H04W 24/02; H04W 64/00; H04W 88/025; H04W 88/06; H04W 88/08; H04W 28/16; H04W 72/0406; H04W 72/0453; H04W 72/02; H04W 72/0493; H04W 88/10; H04W 4/025; H04L 27/0006

USPC .............. 370/322, 329, 395.21, 395.41, 397, 370/399, 431, 437, 252, 328, 330, 334, 335, 370/342, 441, 445; 455/435.1, 435.2, 455/435.3, 453, 454, 464, 561, 574, 448, 455/509, 515, 161.1, 168.1, 450–452.2
See application file for complete search history.

(56) References Cited

U.S. PATENT DOCUMENTS 7,400,903 B2 * 7/2008 Shoemake et al. .......... 455/552.1
7,436,788 B2 * 10/2008 Huschke et al. .............. 370/310
(Continued)

FOREIGN PATENT DOCUMENTS

CN 1810060 A 7/2006
CN 1973493 A 5/2007
(Continued)

OTHER PUBLICATIONS

Extended European Search Report (including European Search Opinion) issued on Jun. 28, 2011, in counterpart European Patent Application No. 08168373.2, 39pp.
(Continued)

*Primary Examiner* — Olumide T Ajibade Akonai
(74) *Attorney, Agent, or Firm* — NSIP Law

(57) ABSTRACT

A mobile system and a base station system for effectively using a licensed spectrum and a shared spectrum are provided. The mobile system includes: an initialization unit to initialize transmitting and receiving of data using at least one of the licensed spectrum and the shared spectrum; a sensing unit to sense a spectrum for transmitting and receiving of the data via the at least one spectrum; and a transceiver to transmit and receive the data via the sensed spectrum.

17 Claims, 13 Drawing Sheets

(51) Int. Cl.
*H04W 24/02* (2009.01)
*H04W 88/10* (2009.01)
*H04W 72/08* (2009.01)

(56) References Cited

U.S. PATENT DOCUMENTS

| | | | |
|---|---|---|---|
| 7,483,711 B2* | 1/2009 | Burchfiel | 455/522 |
| 7,764,967 B2* | 7/2010 | Kim et al. | 455/450 |
| 7,929,963 B2* | 4/2011 | Cho et al. | 455/424 |
| 7,949,357 B2* | 5/2011 | Huttunen et al. | 455/509 |
| 7,986,915 B1* | 7/2011 | Wang | H04B 7/155 455/7 |
| 8,000,715 B2* | 8/2011 | Melpignano et al. | 455/451 |
| 2005/0088992 A1* | 4/2005 | Bolin et al. | 370/329 |
| 2006/0083205 A1 | 4/2006 | Buddhikot et al. | |
| 2006/0160551 A1* | 7/2006 | Matoba et al. | 455/509 |
| 2006/0293067 A1* | 12/2006 | Leung et al. | 455/458 |
| 2007/0104218 A1 | 5/2007 | Hassan et al. | |
| 2008/0002605 A1 | 1/2008 | Todd et al. | |
| 2008/0107095 A1* | 5/2008 | Black et al. | 370/342 |
| 2008/0165754 A1* | 7/2008 | Hu | 370/342 |
| 2009/0135744 A1* | 5/2009 | Chaudhri et al. | 370/278 |
| 2011/0077015 A1* | 3/2011 | Saily et al. | 455/450 |

FOREIGN PATENT DOCUMENTS

| | | |
|---|---|---|
| EP | 1578095 A1 | 9/2005 |
| JP | 2004-503158 | 1/2004 |
| JP | 2006-94001 | 4/2006 |
| JP | 2006-109458 A | 4/2006 |
| JP | 2006-319969 A | 11/2006 |
| JP | 2007-258781 | 10/2007 |
| KR | 2006-60452 | 6/2006 |
| KR | 2006-129807 | 12/2006 |
| KR | 2007-18665 | 2/2007 |
| KR | 2007-55003 | 5/2007 |
| WO | WO 03/101006 | 12/2003 |
| WO | 2006/012018 A1 | 2/2006 |
| WO | WO 2006/107558 A2 | 10/2006 |
| WO | WO 2006/125506 A1 | 11/2006 |
| WO | 2007/021951 A2 | 2/2007 |
| WO | 2007/031958 A2 | 3/2007 |
| WO | WO 2007/108077 A1 | 9/2007 |

OTHER PUBLICATIONS

"IEEE P802.22/WDv0.4.6: Draft Standard for Wireless Regional Area Networks Part 22: Cognitive Wireless RAN Medium Access Control (MAC) and Physical Layer (PHY) specifications: Policies and procedures for operation in the TV Bands", Jan. 1, 2008, 348 pp, Retrieved from the Internet, URL: http://grouper.ieee.org/groups/802/22.

Sengupta, Shamik, et al., "Enhancements to cognitive radio based IEEE 802.22 air-interface", Proceedings of the 2007 IEEE International Conference on Communications (ICC 2007), Glasgow, U.K., Jun. 2007, pp. 5155-5160.

Stevenson, Carl R., et al., "Functional Requirements for the 802.22 WRAN Standard", Aug. 2005, 59pp, Retrieved from the Internet, URL: www.ieee802.org/22/Meeting_documents/2005_Aug_teleconferences/22-05-0007-39-0000_RAN_Requirements.doc.

Wright, David, "Dynamic Spectrum Access in the IEEE 802.22 Wireless Regional Area Network", Second International Conference on Access Networks and Workshops, AccessNets '07, Aug. 1, 2007, 6pp.

Japanese Office Action issued Apr. 8, 2014 in counterpart Japanese Patent Application No. 2013-130359 (8 pages including English translation).

Chinese Office Action issued Jul. 3, 2014 in counterpart Chinese Application No. CN 201210246100.3 (14 pages, in Chinese, with English language translation).

Chinese Office Action issued Dec. 3, 2012 in counterpart Chinese Patent Application No. 200810168430.9 (7 pages, in Chinese).

Japanese Office Action issued Mar. 5, 2013 in counterpart Japanese Patent Application No. 2008-318032 (4 pages, in Japanese).

* cited by examiner

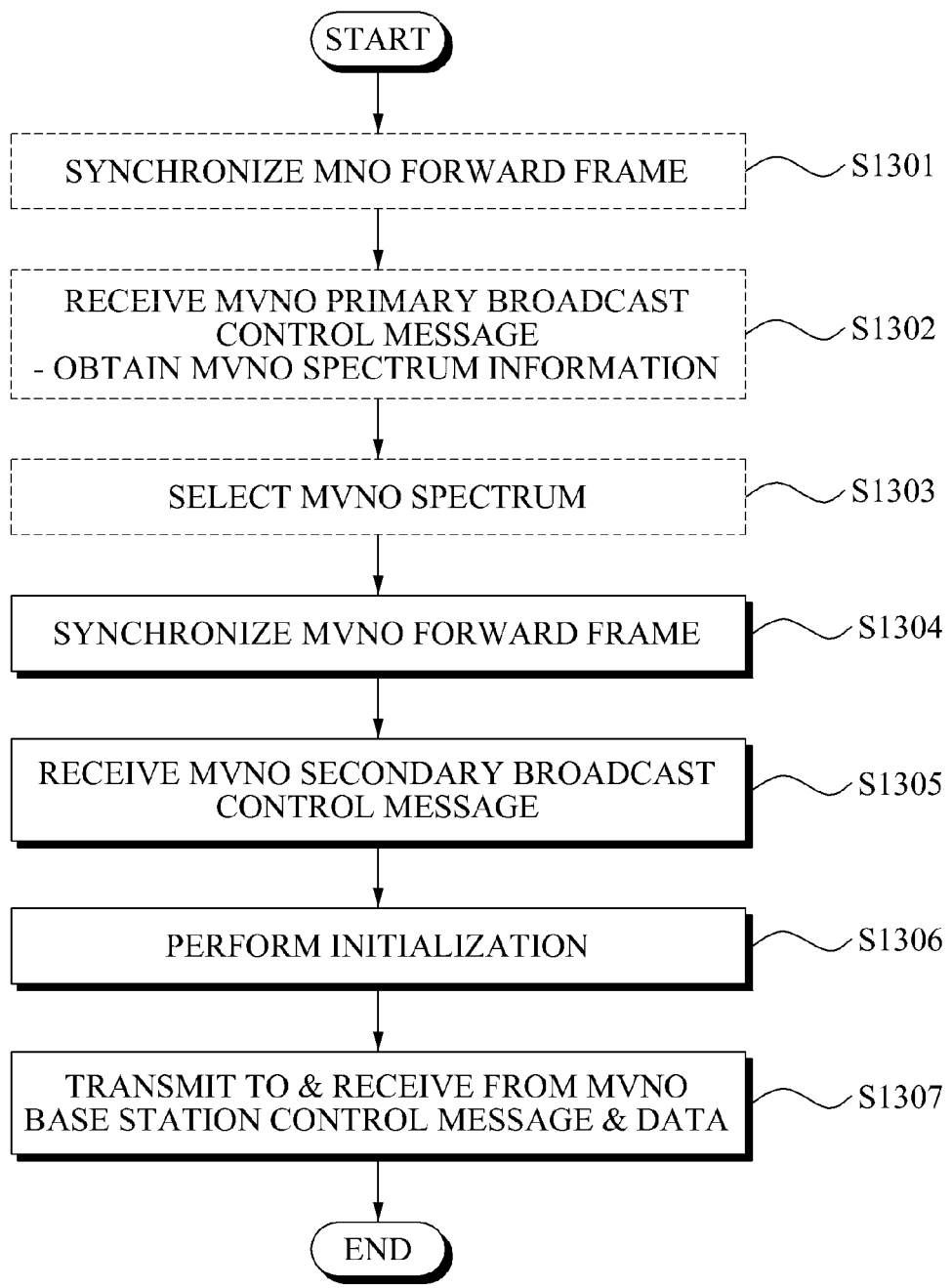

MOBILE SYSTEM AND BASE STATION SYSTEM FOR EFFECTIVELY USING LICENSED SPECTRUM AND SHARED SPECTRUM

CROSS-REFERENCE TO RELATED APPLICATION

This application claims the benefit of Korean Patent Application No. 2008-14615, filed on Feb. 18, 2008 in the Korean Intellectual Property Office, the disclosure of which is incorporated herein by reference.

BACKGROUND OF THE INVENTION

1. Field of the Invention

Aspects of the invention relate to a mobile system and a base station system for effectively using a licensed spectrum and a shared spectrum.

2. Description of the Related Art

Current communication services are generally based on voice-based services. Accordingly, in the case of using a radio data service, it may be difficult to make significant business accomplishment when compared to using the voice service. Also, users are concerned about a current data service fee system. While moving, the users do not usually use the data service. In the case of a service that requires a relatively high data rate, a wideband scheme may be needed.

In future communication environments, a significantly higher transmission speed service than a current service should be possible. For the service that needs a high data rate, wideband frequencies should be secured. However, when considering a current frequency distribution state, securing of the wideband frequencies may be difficult. Accordingly, there is a need for technology that can effectively use a current frequency band.

SUMMARY OF THE INVENTION

Aspects of the invention provide a mobile system and a base station system that can allocate a licensed spectrum and a shared spectrum according to a function of a mobile system to thereby effectively use the shared spectrum.

Other aspects of the invention also provide a mobile system and a base station system that enables a mobile system to periodically operate a communication module with a base station system at a scheduled time to thereby monitor a control message from the base station system and thereby can convert the mobile system from a sleep mode to an awake mode to enable converting of a shared spectrum and thus can improve the power efficiency of the mobile system.

Additional aspects of the invention also provide a mobile system and a base station system that can receive a control message associated with a virtual base station system from a base station system via an allocated spectrum and select a spectrum to be used for communication with the virtual base station system based on the control message and thereby can effectively use a shared spectrum used by the virtual base station system.

According to an aspect of the invention, a mobile system is provided. The mobile system includes: an initialization unit to initialize transmitting and receiving of data using at least one of the licensed spectrum and the shared spectrum; a sensing unit to sense a spectrum for transmitting and receiving of the data via the at least one spectrum; and a transceiver to transmit and receive the data via the sensed spectrum.

The sensing unit may include: a sensing information reporting unit to report sensing information to a base station system via the at least one spectrum; and a shared spectrum changing unit to change the shared spectrum based on a control message that is received from the base station system according to the sensing information.

The licensed spectrum may include a bandwidth to provide at least one of a voice service and a data service that has a data rate of less than or equal to a threshold. The shared spectrum may include a remaining bandwidth after excluding a bandwidth included in the licensed spectrum.

According to another aspect of the invention, a base station system is provided. The base station system includes: a mobile system classifying unit to classify a mobile system depending on an available spectrum between a licensed spectrum and a shared spectrum; and a spectrum allocating unit to allocate at least one of the licensed spectrum and the shared spectrum according to classification of the mobile system.

The mobile system may include: a monitoring unit to monitor a control message from a base station system via the licensed spectrum each predetermined period while in a sleep mode; and a mode converter to convert the sleep mode to an awake mode based on the control message.

According to still another aspect of the invention, a mobile system is provided. The mobile system includes: a control message receiver to receive a control message associated with a virtual base station system from a base station system via an allocated spectrum; a spectrum selector to select a spectrum to be used for communication with the virtual base station system based on the control message; and a data transceiver to transmit and receive data via the selected spectrum.

According to yet another aspect of the invention, a base station system is provided. The base station system includes: a control message transmitter to transmit control information to a mobile system, wherein the control information includes spectrum information of an associated virtual base station system; and a communication repeater to relay communication between the mobile system and the virtual base station system, based on the spectrum information.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 13 is a flowchart illustrating an initial access process of a mobile system according to an embodiment of the invention.

DETAILED DESCRIPTION OF EMBODIMENTS

Figure 1:
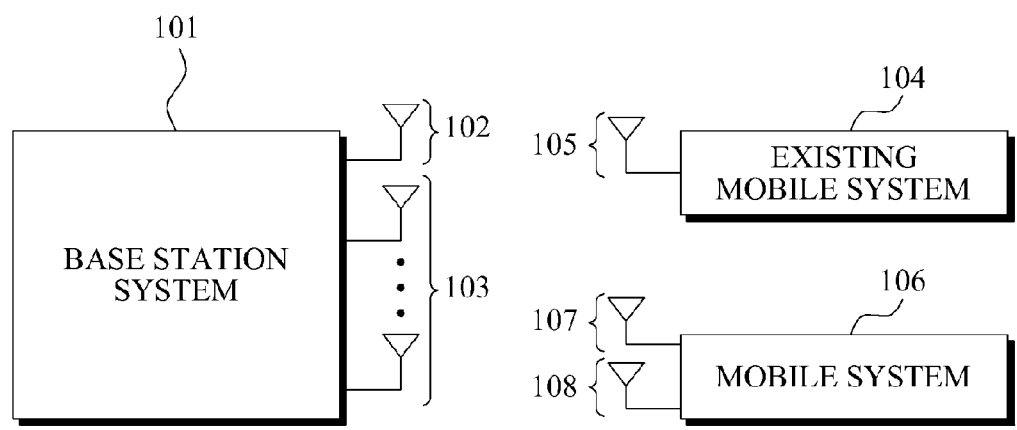
FIG. 1 illustrates a mobile system and a base station system according to an embodiment of the invention.

Reference will now be made in detail to present embodiments of the present invention, examples of which are illustrated in the accompanying drawings, wherein like reference numerals refer to the like elements throughout. The exemplary embodiments are described below in order to explain the present invention by referring to the figures.

FIG. 1 shows a base station system 101 and a mobile system 106 according to an embodiment of the invention.

In FIG. 1, the usage of a spectrum may be dualized according to a function of the mobile system 106. In order to dualize the usage of the spectrum, the base station system 101 may include both an apparatus 102 for transmitting and receiving of a licensed spectrum and an apparatus 103 for transmitting and receiving of a shared spectrum. An existing mobile system 104 may include only an apparatus 105 for transmitting and receiving the licensed spectrum. The mobile system 106 may include both an apparatus 107 for transmitting and receiving the licensed spectrum and an apparatus 108 for transmitting and receiving the shared spectrum. The existing mobile system 104 may be constructed to use only the licensed spectrum that can be set to the bandwidth of generally 1.25 MHz through 10 MHz, which was generally used in the previous mobile system. The mobile system 106 with a dynamic access function may be constructed to use both the licensed spectrum and the shared spectrum.

The existing mobile system 104 may receive a service with a low or medium data rate and a voice, using only the licensed spectrum. The mobile system 106 may receive the service with the low or the medium data rate and the voice, using the licensed spectrum and may also receive a service with a high data rate, using the shared spectrum. Since the shared spectrum is accessible to a dynamic spectrum, the shared spectrum may use a wider bandwidth than the licensed spectrum. Through the usage of the shared spectrum, it is possible to more effectively provide the service with the high data rate.

Figure 2:
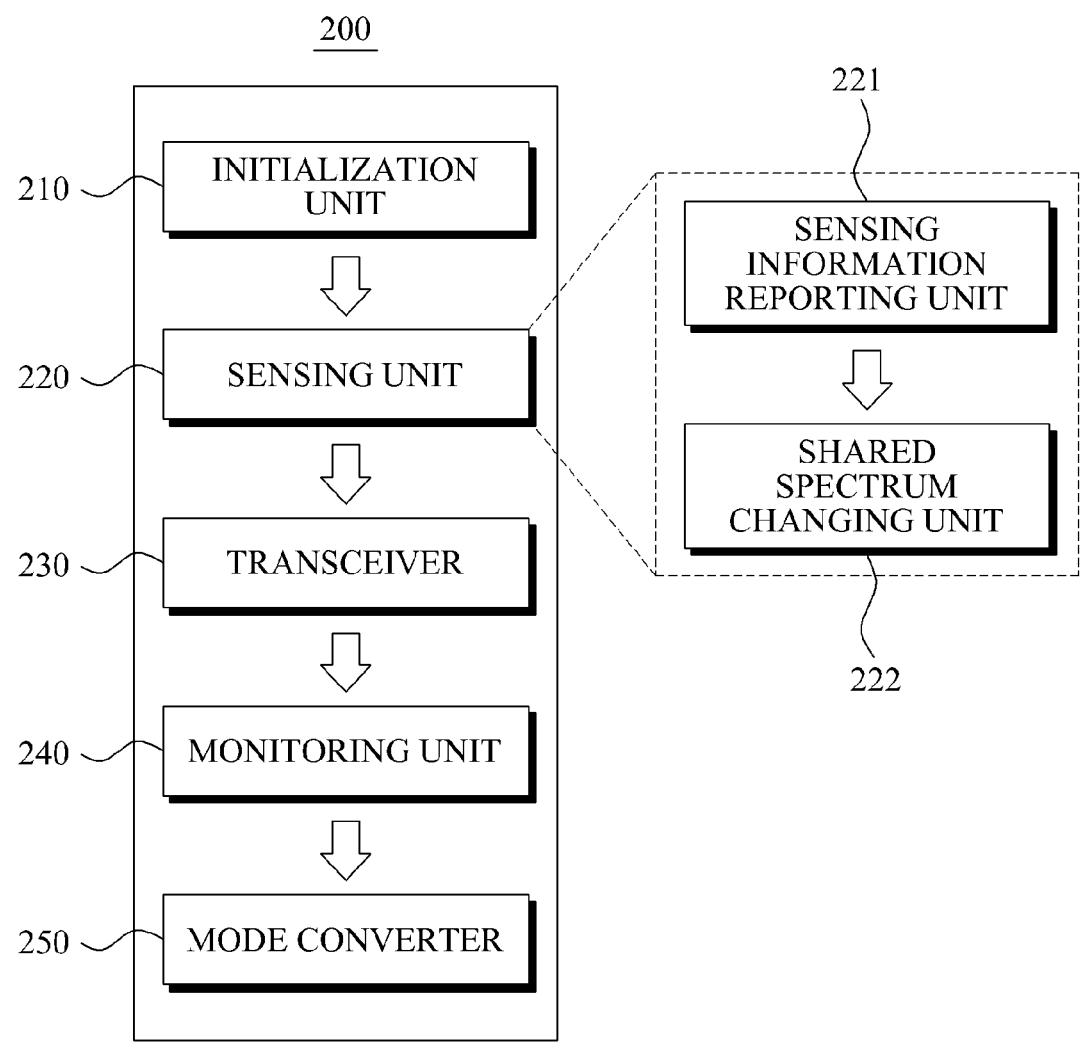
FIG. 2 is a block diagram illustrating an internal configuration of a mobile system according to an embodiment of the invention.

FIG. 2 is a block diagram illustrating an internal configuration of a mobile system 200 according to an embodiment of the invention. The mobile system 200 may include an initialization unit 210, a sensing unit 220, and a transceiver 230, as shown in FIG. 2.

The initialization unit 210 may initialize transmitting and receiving of data using at least one of the licensed spectrum and the shared spectrum. The licensed spectrum may include a bandwidth to provide at least one of a voice service and a data service that has a data rate of less than or equal to a threshold. The shared spectrum may include a remaining bandwidth after excluding a bandwidth included in the licensed spectrum. When the shared spectrum is secured in the mobile system 200, the initialization unit 210 may select any one of the licensed spectrum and the shared spectrum to thereby initialize transmitting and receiving of the data. Conversely, when the shared spectrum is not secured, the initialization unit 210 may initialize transmitting and receiving of the data using the licensed spectrum.

The sensing unit 220 may sense a spectrum for transmitting and receiving of the data via the at least one spectrum. In order to use the shared spectrum in the mobile system 200, an operation is needed for sensing the shared spectrum and securing the shared spectrum. In order to sense the shared spectrum, there is a need to sense, periodically or on demand, an in-band and an out-band spectrum and report sensing information. When reporting the sensing information, the licensed spectrum or the shared spectrum may be used. Resource allocation with respect to the shared spectrum may be controlled by the initial licensed spectrum and may also be controlled by the licensed spectrum and by the same shared spectrum or another secured shared spectrum. In particular, the resource allocation and management of the shared spectrum using a stable spectrum such as the licensed spectrum may enable a frequency spectrum to be more readily managed in the entire system.

For the above operation, the sensing unit 220 may include a sensing information reporting unit 221 and a shared spectrum changing unit 222. The sensing information reporting unit 221 may report sensing information to a base station system via the at least one spectrum. The shared spectrum changing unit 222 may change the shared spectrum based on a control message that is received from the base station system according to the sensing information.

The transceiver 230 may transmit and receive the data via the sensed spectrum. The mobile system 200 may be allocated with the shared spectrum using the initial licensed spectrum and then be allocated with the same shared spectrum or another shared spectrum using the licensed spectrum or the shared spectrum, using the sensing unit 220. Through this, the mobile system 200 may transmit and receive the data from and to a base station system via the allocated shared spectrum.

The mobile system 200 may include a monitoring unit 240 and a mode converter 250. The monitoring unit 250 may monitor a control message from a base station system via the licensed spectrum each predetermined period while in a sleep mode. The mode converter 250 may convert the sleep mode to an awake mode based on the control message. The sleep mode and the awake mode may be for effectively using the power of the mobile system 200 and will be described in detail later.

Figure 3:
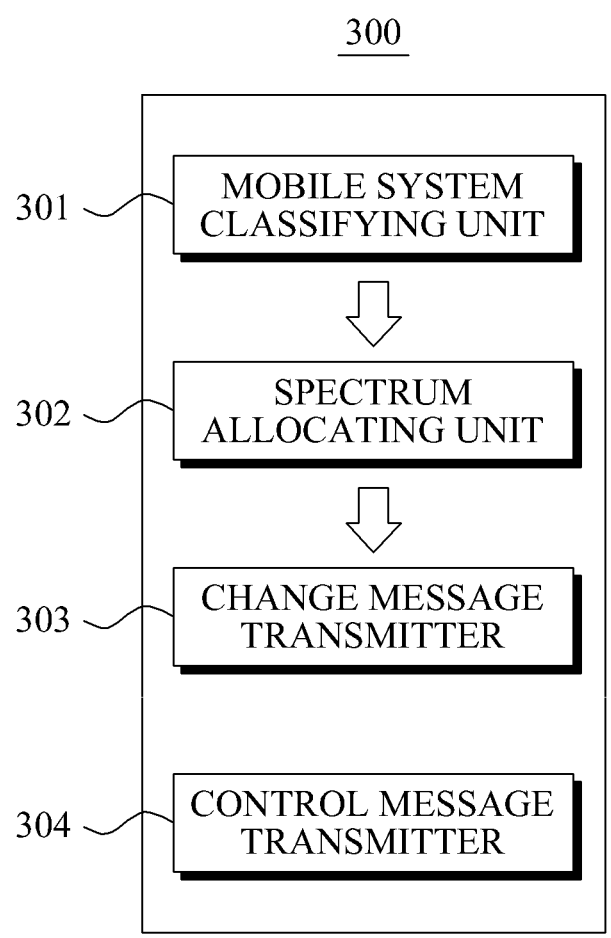
FIG. 3 is a block diagram illustrating an internal configuration of a base station system according to an embodiment of the invention.

FIG. 3 is a block diagram illustrating an internal configuration of a base station system 300 according to an embodiment of the invention. The base station system 300 may include a mobile system classifying unit 301, a spectrum allocating unit 302, a change message transmitter 303, and a control message transmitter 304.

The mobile system classifying unit 301 may classify a mobile system according to an available spectrum between a licensed spectrum and a shared spectrum. The mobile system classifying unit 301 may classify the mobile system into a mobile system that can use only the licensed spectrum and a mobile system that can use both the licensed spectrum and the shared spectrum. The classification may be performed by a mobile system function database (not shown) that may be included in or be connected to the base station system 300. For example, the mobile system function database may include information detailing that each mobile system is classified according to a band used in the mobile system between the licensed spectrum and the shared spectrum. In the case of a mobile system that desires to be allocated with the shared spectrum, the mobile system classifying unit 301 may classify the mobile system by searching the mobile system function database.

The spectrum allocating unit 302 may allocate at least one of the licensed spectrum and the shared spectrum according to classification of the mobile system. Specifically, the mobile system that can use only the licensed spectrum may be enabled to transmit and receive data via the licensed spectrum. The mobile system that can use both the licensed spectrum and the shared spectrum may be enabled to use at least one portion of the licensed spectrum and the shared spectrum.

The change message transmitter 303 may transmit a change message associated with a change of the shared spectrum to the mobile system based on sensing information that is received from the mobile system via the least one spectrum. The change message transmitter 303 may determine whether it is necessary to change the shared spectrum of the mobile system, based on sensing information that is received from the mobile system. The change message transmitter 303 may transmit to the mobile system the change message for controlling the change of the shared spectrum. In this case, the mobile system may transmit a response message to the base station system 300 in response to the change message. The mobile system may change the shared spectrum and then transmit and receive data via the changed shared spectrum.

The control message transmitter 304 may transmit a control message via the licensed spectrum at a scheduled time in order to convert the mobile system from the sleep mode to the awake mode. Since the mobile system in the sleep mode cannot communicate with the base station system 300, the mobile system may not verify that the shared spectrum is changed. Accordingly, the mobile system in the sleep mode may periodically operate a communication module at the scheduled time, monitor the control message, and convert the mobile system from the sleep mode to the awake mode according to the control message. Through this, the mobile system may verify the change of the shared spectrum.

Figure 4:
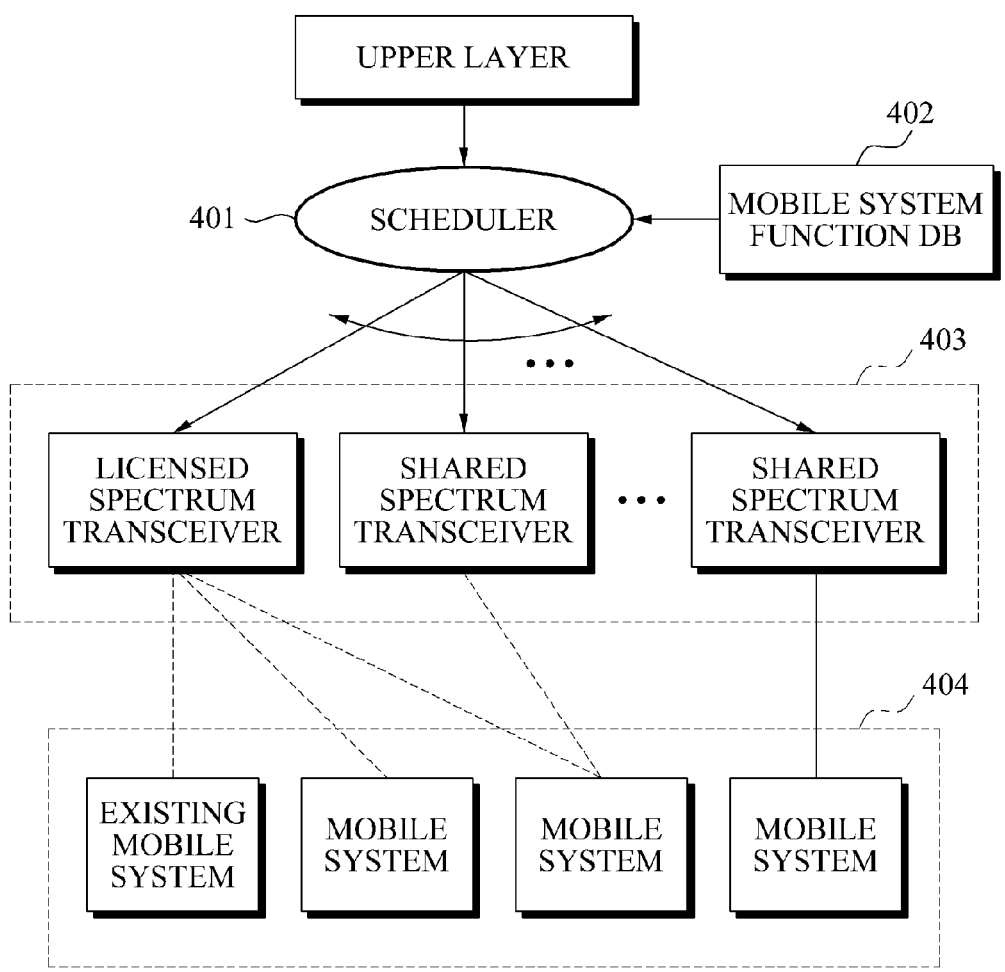
FIG. 4 illustrates an example of a basic operation of a base station system according to an embodiment of the invention.

FIG. 4 illustrates an example of a basic operation of a base station system according to an embodiment of the invention. The base station system should allocate a corresponding spectrum to a classified mobile system. For this, the base station system may use a scheduler 401 that may be included in the base station system. The scheduler 401 may correspond to the mobile system classifying unit 301 of FIG. 3. Based on a mobile system function database 402, the scheduler 401 may select from a transceiver group 403 a transceiver corresponding to each of mobile systems 404 that is desired to be allocated with a spectrum, allocate a corresponding spectrum to each of the mobile systems 404, and transmit and receive various types of control messages or data via the selected transceiver. The transceiver group 403 may include a licensed spectrum transceiver and shared spectrum transceivers.

Figure 5:
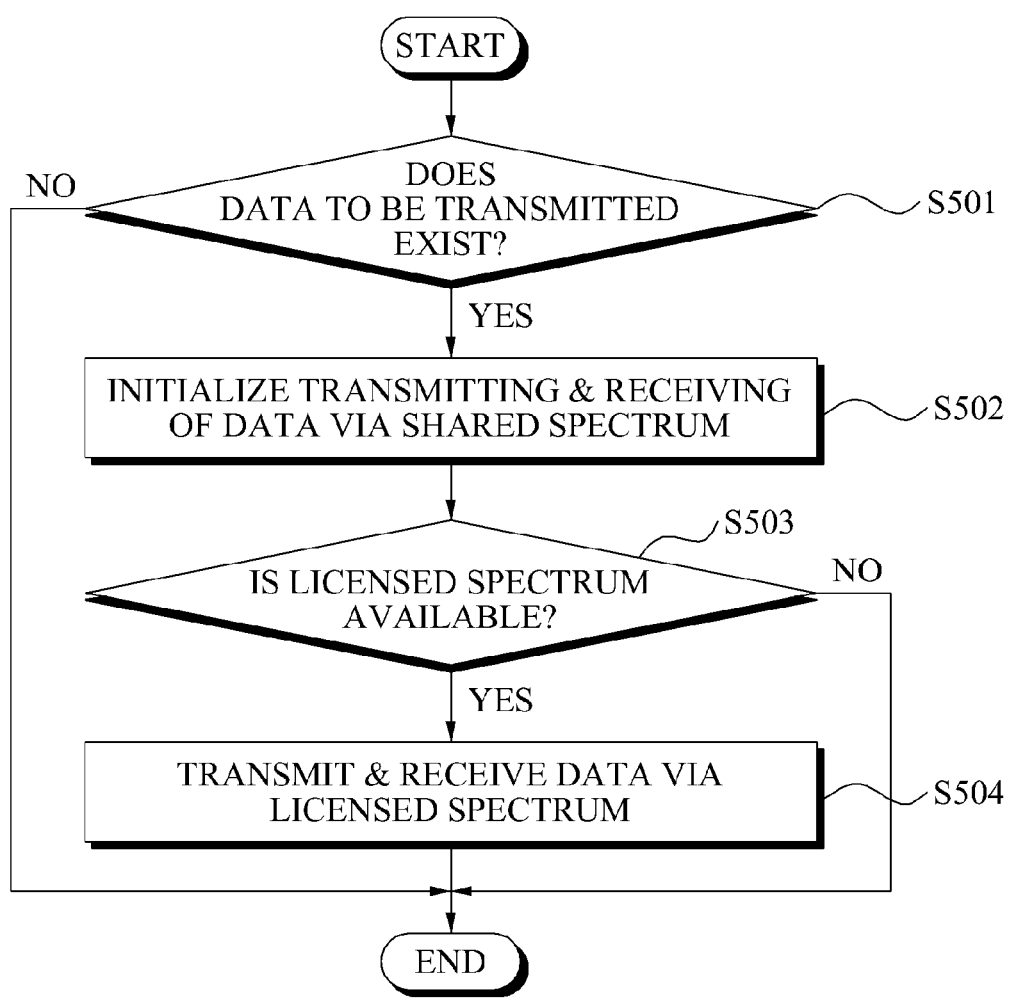
FIG. 5 is a flowchart illustrating a method of initializing transmitting and receiving of data, and transmitting and receiving the data according to an embodiment of the invention.

FIG. 5 is a flowchart illustrating a method of initializing transmitting and receiving of data, and transmitting and receiving the data according to an embodiment of the invention.

Figure 6:
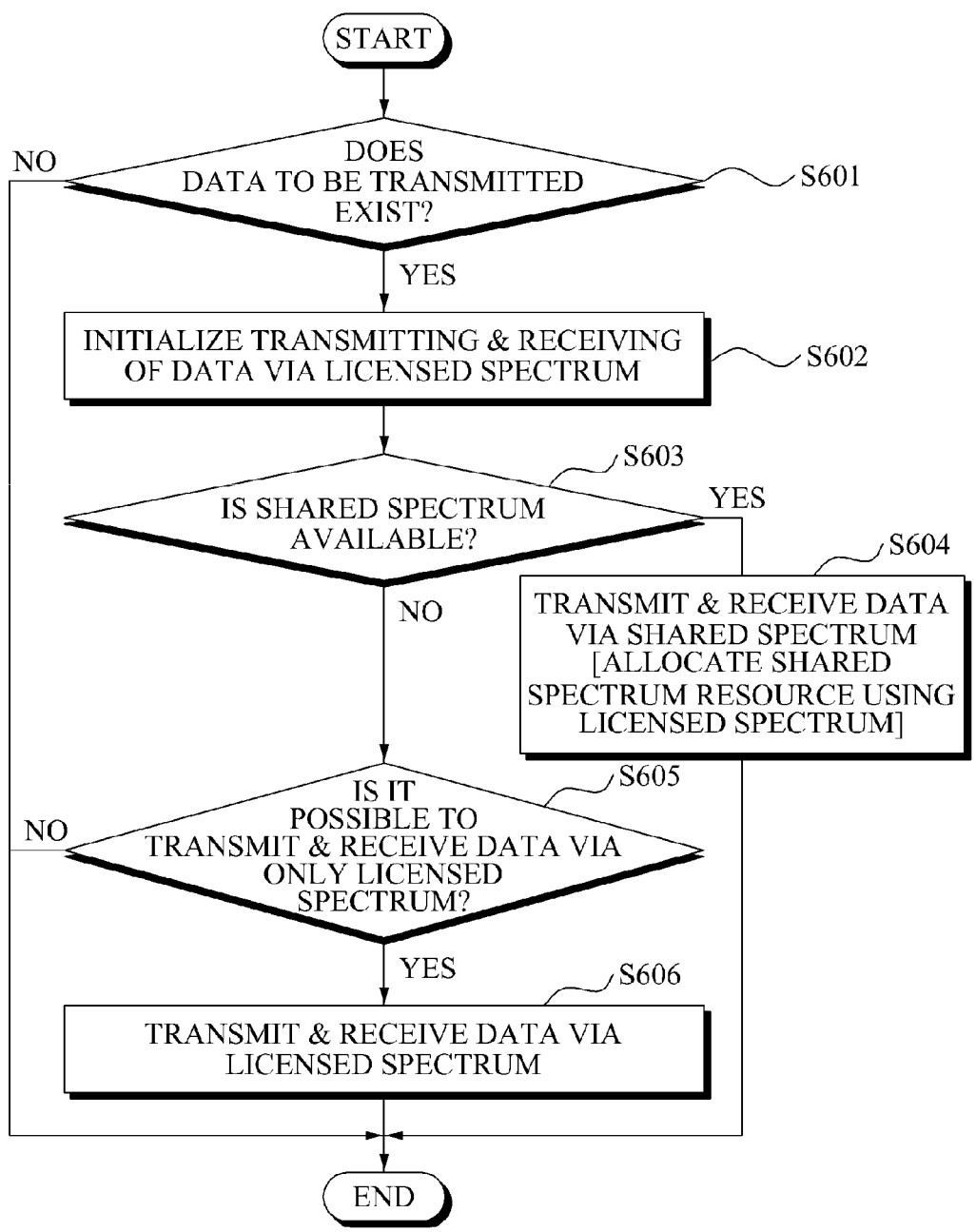
FIG. 6 is a flowchart illustrating a method of initializing transmitting and receiving of data, and transmitting and receiving the data according to another embodiment of the invention.

FIG. 6 is a flowchart illustrating a method of initializing transmitting and receiving of data, and transmitting and receiving the data according to another embodiment of the invention.

Figure 7:
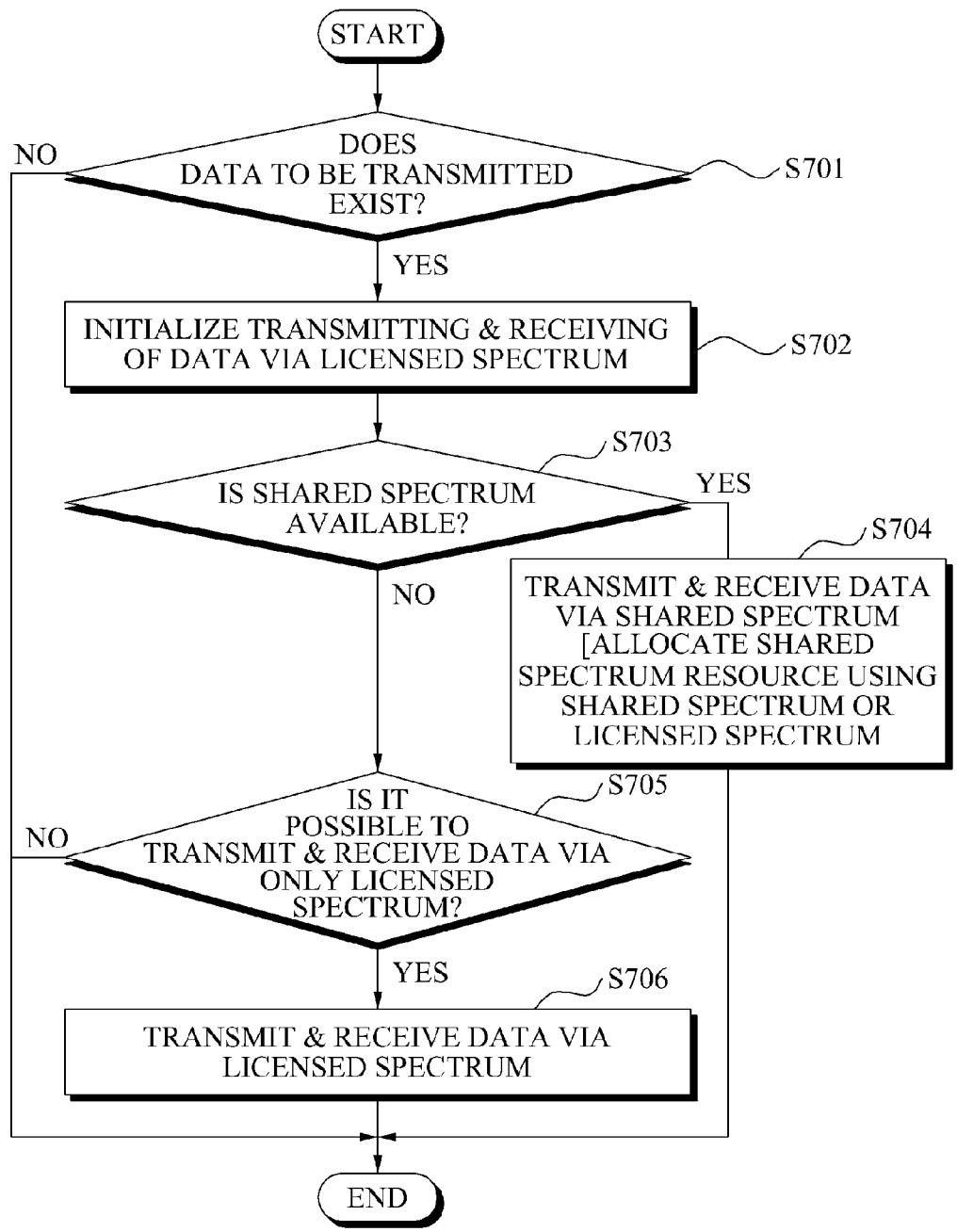
FIG. 7 is a flowchart illustrating a method of initializing transmitting and receiving of data, and transmitting and receiving the data according to still another embodiment of the invention.

FIG. 7 is a flowchart illustrating a method of initializing transmitting and receiving of data, and transmitting and receiving the data according to still embodiment of the invention.

FIG. 5 is an example of a method of transmitting and receiving data in a mobile system via a licensed spectrum. In operation S501, the mobile system may determine whether data to be transmitted exists. When the data exists, the mobile system may initialize transmitting and receiving of the data via a shared spectrum in operation S502. In operation S503, the mobile system may determine whether the licensed spectrum is available. When the licensed spectrum is available, the mobile system may transmit and receive the data via the licensed spectrum in operation S504.

FIG. 6 is an example of a method of transmitting and receiving data in a mobile system via both a licensed spectrum and a shared spectrum. In operation S601, the mobile system may determine whether data to be transmitted exists. When the data exists, the mobile system may initialize transmitting and receiving of the data via the licensed spectrum in operation S602. In operation S603, the mobile system may determine whether the shared spectrum is available. When the shared spectrum is available, the mobile system may transmit and receive the data via the shared spectrum in operation S604. Operation S604 may be performed when the shared spectrum is not allocated to the mobile system, or when the mobile system desires to be allocated with a resource of the shared spectrum using the stable licensed spectrum. Conversely, when the shared spectrum is unavailable in operation S603, the mobile system may determine whether it is possible to transmit and receive the data via only the licensed spectrum in operation S605. When it is possible, the mobile system may transmit and receive the data via the licensed spectrum in operation S606.

FIG. 7 is another example of a method of transmitting and receiving data in a mobile system using both a licensed spectrum and a shared spectrum. In operation S701, the mobile system may determine whether data to be transmitted exists. When the data exists, the mobile system may initialize transmitting and receiving of the data via the shared spectrum in operation S702. In operation S703, the mobile system may determine whether the shared spectrum is available. When the shared spectrum is available, the mobile system may transmit and receive the data via the shared spectrum in operation S704. When allocating a resource to the shared spectrum to be used for transmitting and receiving the data, it is possible to selectively use any one of the allocated shared spectrum and the licensed spectrum. Conversely, when the shared spectrum is unavailable in operation S703, the mobile system may determine whether it is possible to transmit and receive the data via only the licensed spectrum in operation S705. When it is possible, the mobile system may transmit and receive the data via the licensed spectrum in operation S706.

Figure 8:
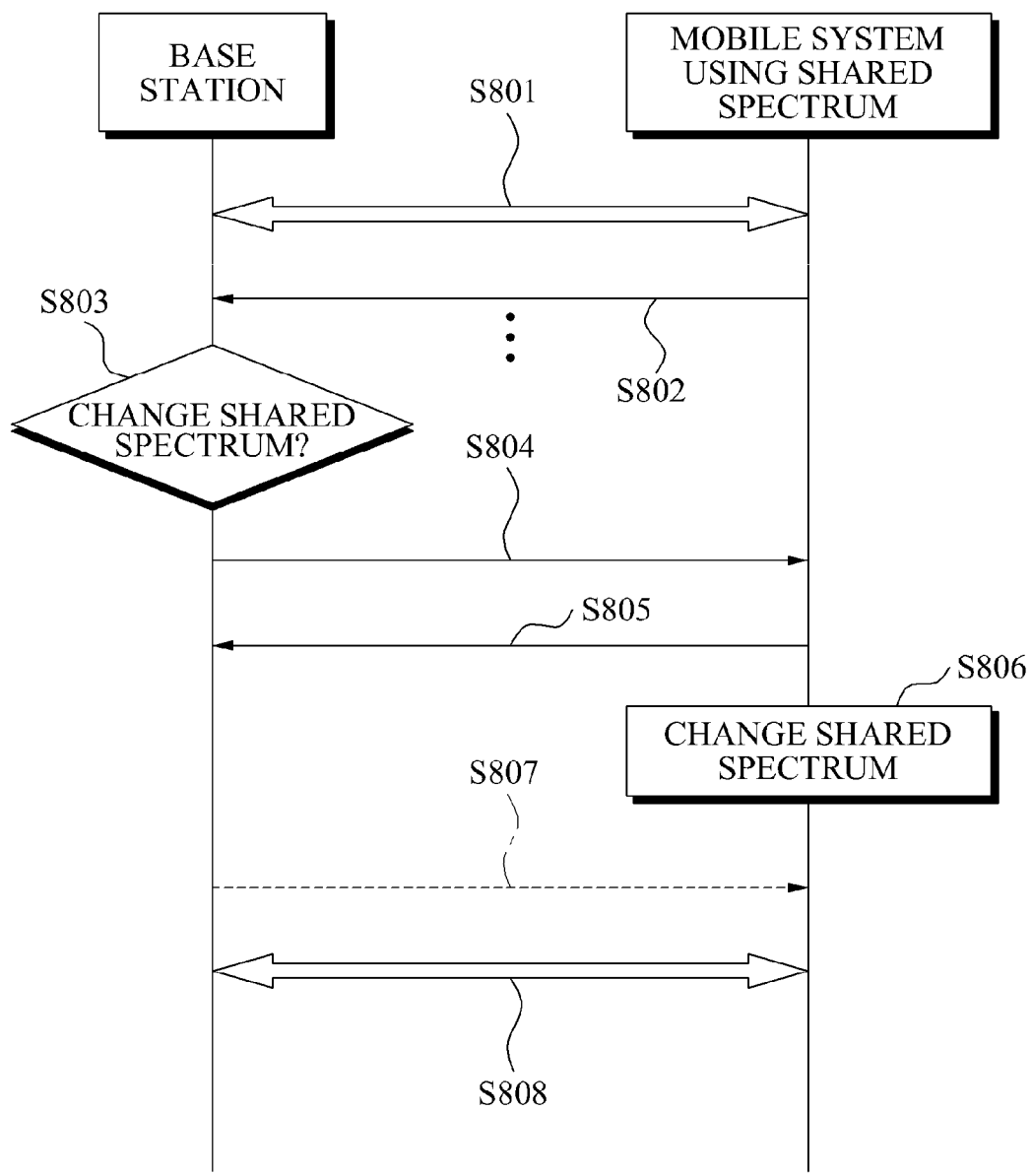
FIG. 8 illustrates an example of managing a shared spectrum according to an embodiment of the invention.

FIG. 8 shows an example of managing a shared spectrum according to an embodiment of the invention.

In operation S801, data may be transmitted and received between a base station and a mobile system using a shared spectrum, via the shared spectrum. In operation S802, the mobile system may report, periodically or on demand, sensing information to the base station. In operation S803, the base station may determine whether it is necessary to change the shared spectrum for the mobile system based on the sensing information. In operation S804, when it is necessary, the base station may transmit a predetermined change message to the mobile system. In operation S805, the mobile system may receive the change message and transmit a response message to the base station in response to the change message. In operation S806, the mobile system may change the shared spectrum based on the change message. When the shared spectrum is changed, the base station and the mobile system may perform synchronization for the changed shared spectrum in operation S807. After the synchronization, the data may be transmitted and received between the base station and the mobile system via the changed shared spectrum in operation S808.

The sensing information, the change message, the response message, and the like may be transmitted via the shared spectrum, but the licensed spectrum may be used for more stable management. For example, when an interference amount of the shared spectrum is serious, the licensed spectrum may be used. When transmitting the control message for the synchronization, the shared message with a relatively higher data rate may be used.

As described above, a mobile system and a base station system according to an aspect of the invention may effectively manage a shared spectrum with a high data rate.

Figure 9:
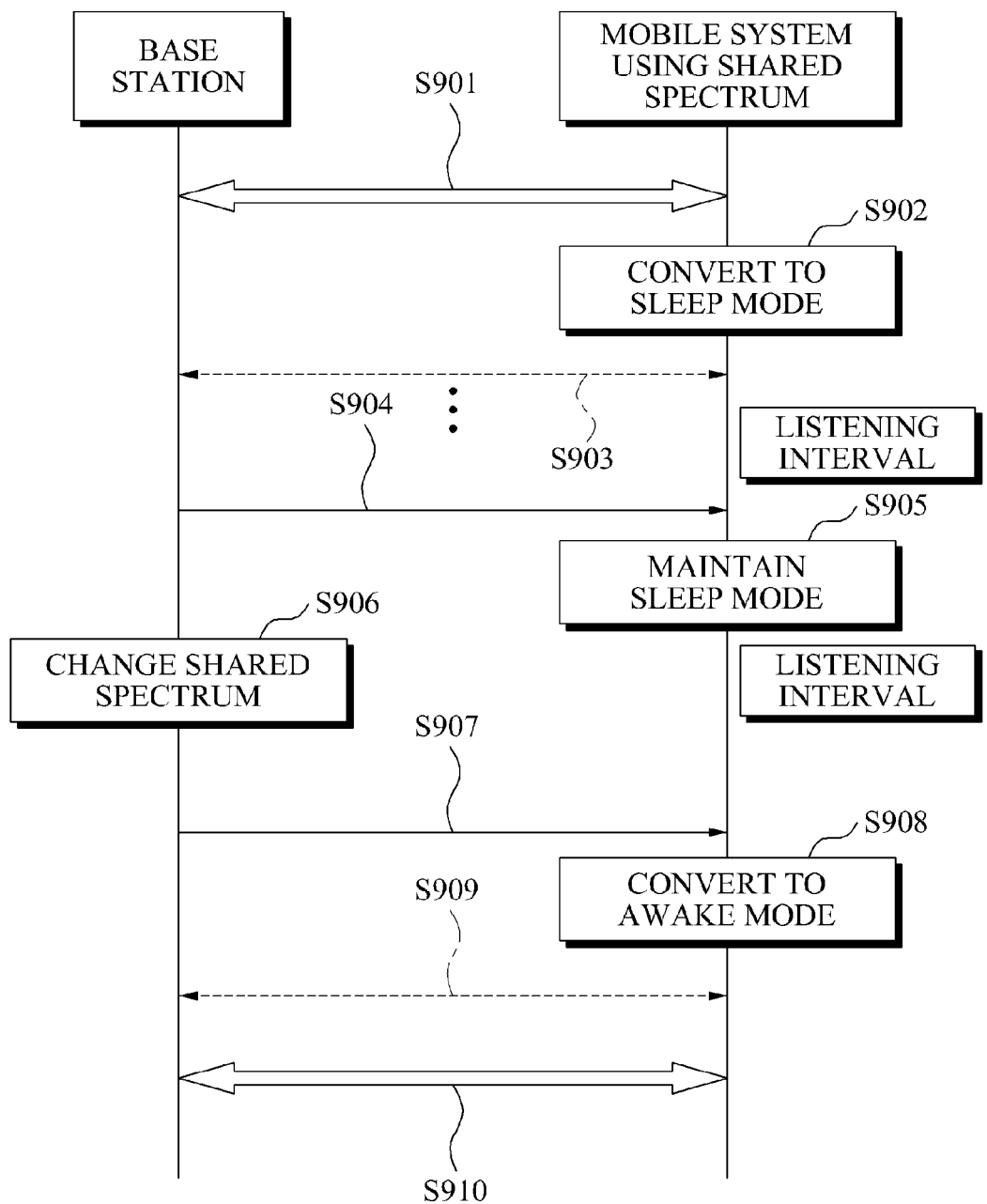
FIG. 9 illustrates an example of a sleep mode operation according to an embodiment of the invention.

FIG. 9 is an example of a sleep mode operation according to an embodiment of the invention.

In operation S901, data may be transmitted and received between a base station and a mobile system using a shared spectrum, via the shared spectrum. In operation S902, the mobile system may convert to a sleep mode for the power efficiency. The sleep mode may shut off a power of a communication module with the base station to thereby improve the power efficiency of the mobile system. In the sleep mode, the mobile system cannot communicate with the base station at all. Accordingly, the mobile system may operate the communication module each period such as a listening interval at a scheduled time with the base station to thereby convert to an awake mode.

After converting to the sleep mode in operation S902, the mobile system may monitor a control message from a base station system via the licensed spectrum each predetermined period while in the sleep mode in operation S903. In operation S904, the base station may transmit a control message to the mobile system. Specifically, since the control message is received prior to operation S906, the control message may not include information about change of the shared spectrum. Accordingly, in operation S905, the mobile system may maintain the sleep mode. When the shared spectrum is changed in operation S906, the base station may transmit to the mobile system a control message that includes information associated with the change of the shared spectrum. In operation S908, the mobile system that receives the control message may convert to the awake mode.

In operation S909, the mode-converted mobile system and the base station may perform synchronization for the changed shared spectrum. In operation S910, data may be transmitted and received between the base station and the mobile system via the synchronized shared spectrum.

As described above, a mobile system according to an aspect of the invention may maintain a constant service even when a shared spectrum is changed.

Figure 10:
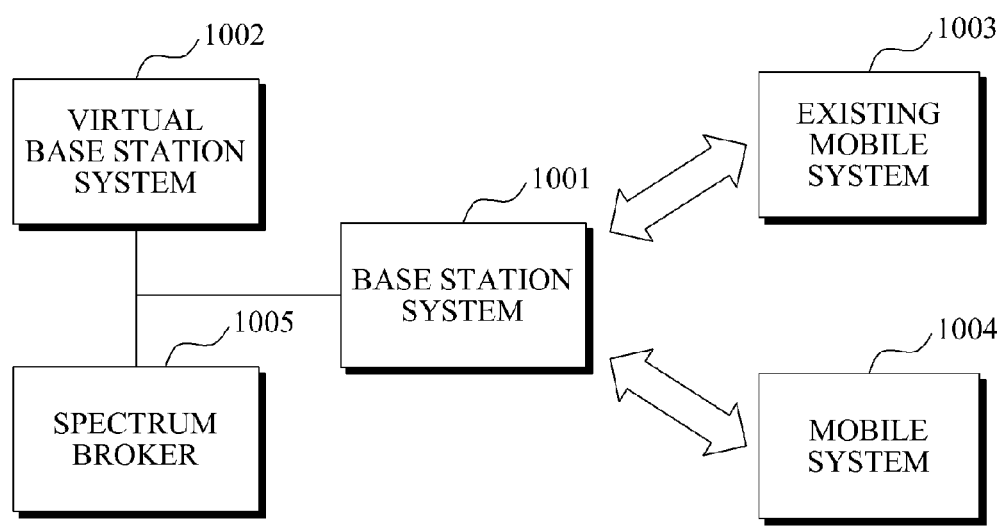
FIG. 10 is a block diagram illustrating a mobile system, a base station system, and a virtual base station system according to an embodiment of the invention.

FIG. 10 is a block diagram illustrating a mobile system 1004, a base station system 1001, and a virtual base station system 1002 according to an embodiment of the invention.

The virtual base station system 1002 may use the infrastructure of the base station system 1001. The virtual base station system 1002 may provide a radio voice service and a data service via a shared spectrum, instead of a frequency spectrum that is used in the base station system 1001. Since the shared spectrum can be changed according to a time and a location, information associated with the shared spectrum may be included in a control message such as broadcast information of the base station system 1001. Accordingly, when an existing mobile system 1003 and the mobile system 1004 perform an initial access, the existing mobile system 1003 and the mobile system 1004 may obtain information about the virtual base station system 1002 from the broadcasted control message and be connected to the virtual base station system 1002 via a shared spectrum corresponding to the information.

A primary broadcast control message for a Mobile Virtual Network Operator (MVNO) for the virtual base station system 1002 may be broadcasted by the base station system 1001. The primary broadcast control message may include minimum basic broadcast control information such as an identifier of the virtual base station system 1002 and spectrum information such as a shared spectrum or an open-type spectrum that can be used in the virtual base station system 1002. The shared spectrum that is used in the virtual base station system 1002 may enable transmitting and receiving of basic control information for operating of the virtual base station system 1002, control information such as a general control message for transmitting and receiving of data, sensing for spectrum management, etc, and data, and the like.

The base station system 1001 may basically include an apparatus that can process a spectrum, generally, a licensed spectrum, of the base station system 1001. The base station system 1001 may be connected with a central control apparatus in a wired way. The virtual base station system 1002 may manage a subscriber using the central control apparatus of the base station system 1001. Since a data service of the virtual base station system 1002 is enabled via the shared spectrum, the base station system 1001 should include an apparatus that can support transmitting and receiving of data via the shared spectrum. The shared spectrum processing apparatus may be installed in the base station system 1001. An operator of the virtual base station system 1002 may charge the base station system 1001 with an appropriate rental fee. The operator may directly install the shared spectrum processing apparatus in the base station system 1001. The shared spectrum may be secured through actual sensing and may also be secured via a spectrum broker 1005. The spectrum broker 1005 functions to manage the shared spectrum in a center.

The existing mobile system 1003 may include an apparatus that can process only the spectrum of the base station system 1001, whereas the mobile system 1004 may process both the spectrum of the base station system 1001 and the spectrum of the virtual base station system 1002.

Figure 11:
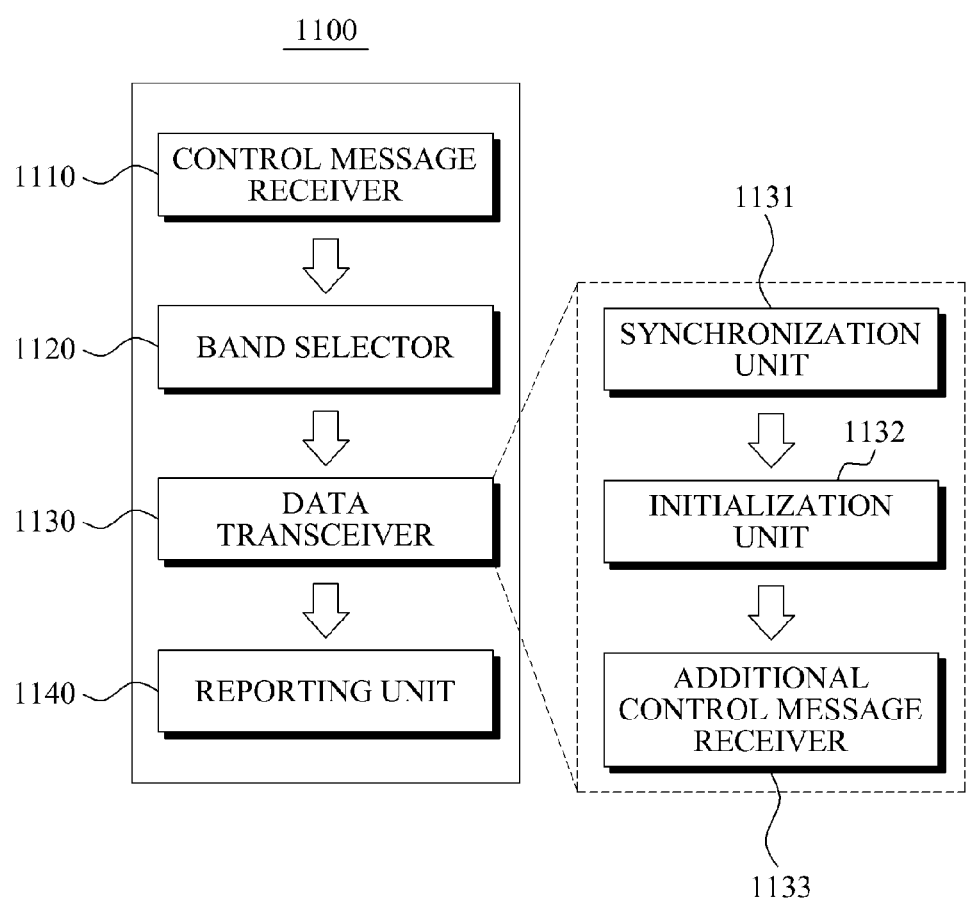
FIG. 11 is a block diagram illustrating an internal configuration of a mobile system according to an embodiment of the invention.

FIG. 11 is a block diagram illustrating an internal configuration of a mobile system 1100 according to an embodiment of the invention. The mobile system 1100 may include a control message receiver 1110, a spectrum selector 1120, a data transceiver 1130, and a reporting unit 1140, as shown in FIG. 11.

The control message receiver 1110 may receive a control message associated with a virtual base station system from a base station system via an allocated spectrum. The control message may include at least one of an identifier of the virtual base station system and spectrum information. The mobile system 1100 may retrieve the virtual base station system to be used, based on the control message, and be allocated with the spectrum.

The spectrum selector 1120 may select a spectrum to be used for communication with the virtual base station system based on the control message. The selected spectrum may include at least one portion of the shared spectrum that is secured in the virtual base station system via a spectrum broker.

The data transceiver 1130 may transmit and receive data via the selected spectrum. In order to transmit and receive the data, the data transceiver 1130 may include a synchronization unit 1131 to perform forward frame synchronization with the virtual base station system; an initialization unit 1132 to receive a broadcast control message from the virtual base station system to perform initialization between the mobile system and the virtual base station system; and an additional control message receiver 1133 to receive an additional control message via the selected spectrum. The additional control message may include at least one of control information for operation of the virtual base station system, control information for transmitting and receiving of data, and sensing information for spectrum management.

The reporting unit 1140 may report sensing information to the virtual base station system. The sensing information may be used to secure a shared spectrum in the virtual base station system.

Figure 12:
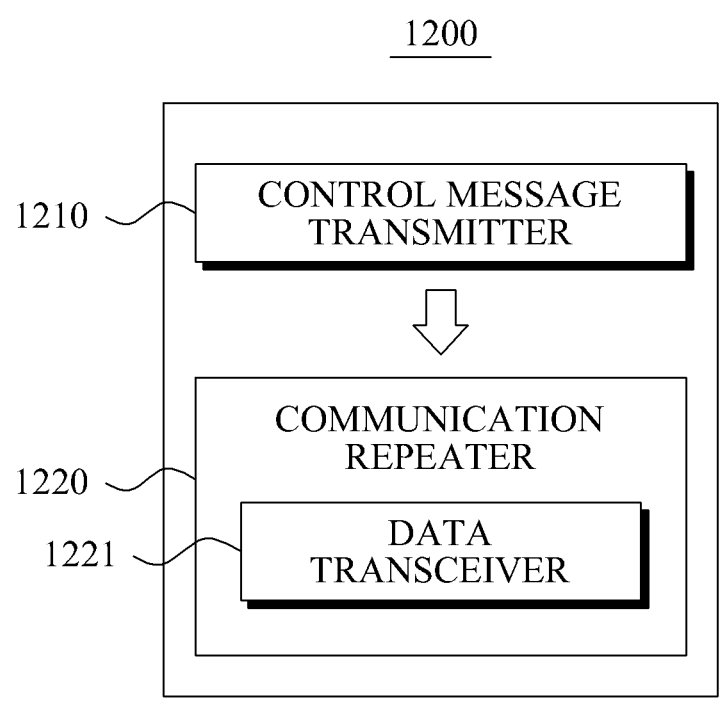
FIG. 12 is a block diagram illustrating an internal configuration of a base station system according to an embodiment of the invention.

FIG. 12 is a block diagram illustrating an internal configuration of a base station system 1200 according to an embodiment of the invention. The base station system 1200 may include a control message transmitter 1210 and a communication repeater 1220 as shown in FIG. 12.

The control message transmitter 1210 may transmit control information to a mobile system. The control information may include spectrum information of an associated virtual base station system. The control message may further include an identifier of the virtual base station system. The mobile system may communicate with the virtual base station system corresponding to the identifier, based on the spectrum information.

The communication repeater 1220 may relay a communication between the mobile system and the virtual base station system, based on the spectrum information. The communication repeater 1220 may include a data transceiver 1221 to transmit and receive data for the virtual base station system via a shared spectrum. Specifically, the communication repeater 1220 may relay transmitting and receiving of the data between the virtual base station system and the mobile system that can process the spectrum of the virtual base station system.

FIG. 13 is a flowchart illustrating an initial access process of a mobile system according to an embodiment of the invention. The term "Mobile Network Operator (MNO) used herein may be a base station system or a service according to an aspect of the invention. The term "MVNO" used herein may be a virtual base station system or a service according to an aspect of the invention.

In operation S1301, when a mobile system that enrolled in the MVNO performs the initial access, the mobile system may initially retrieve an MNO spectrum and synchronize an MNO forward frame. In operation S1302, the mobile system may receive an MVNO primary broadcast control message that is MVNO shared spectrum information included in the MNO forward frame to thereby obtain MVNO spectrum information. In operation S1303, the mobile system may select the MVNO spectrum. In operation S1304, the mobile system may retrieve the selected MVNO spectrum and synchronize the MVNO forward frame. In operation S1305, the mobile system may receive a secondary broadcast control message that is broadcasted in the MVNO spectrum. In operation S1306, the mobile system may perform initialization between the mobile system and the virtual base station system that is an MVNO base station. The MVNO base station may be an MNO base station that supports the MVNO and operates in the MVNO shared spectrum. If necessary after the initialization is over, the mobile system may transmit to and receive from the MVNO base station data and control message in operation S1307.

As described above, a mobile system and a base station system according to an aspect of the invention may receive a control message associated with a virtual base station system from a base station system via an allocated spectrum and select a spectrum to be used for communication with the virtual base station system based on the control message and thereby may effectively use a shared spectrum used by the virtual base station system.

For the operation of the invention, an MVNO may secure a shared spectrum using a spectrum broker and may also secure the shared spectrum based on reported sensing information of a terminal and the like. An open-type spectrum may be used. When it is necessary to change the MVNO spectrum, change information may be reported using the MVNO spectrum. Also, the change information may be reported using an MVNO broadcast control message of an MNO spectrum. The usage of the MNO spectrum of the MVNO may be based on paging and controlling of a sleep mode an MVNO terminal.

Although a few embodiments of the present invention have been shown and described, it would be appreciated by those skilled in the art that changes may be made to these embodiments without departing from the principles and spirit of the invention, the scope of which is defined by the claims and their equivalents.

What is claimed is:

1. A mobile system to support a communication service of a licensed spectrum and a communication service of a shared spectrum, the mobile system comprising:
   an initialization unit configured to initialize transmitting and receiving of data using the shared spectrum;
   a sensing unit configured to sense a spectrum for transmitting and receiving of the data via the shared spectrum;
   a transceiver configured to transmit and receive the data via the sensed spectrum;
   a sensing information reporting unit configured to report sensing information to a base station system via at least one of the licensed spectrum and the shared spectrum; and
   a shared spectrum changing unit configured to change the frequency band of the shared spectrum based on a change message that is received from the base station system,
   wherein the mobile system is configured to allocate at least one of the licensed spectrum and the shared spectrum according to classification of the mobile system depending on an available spectrum that is available in at least one of the licensed spectrum and the shared spectrum.

2. The mobile system as claimed in claim 1, wherein:
   the licensed spectrum includes a bandwidth to provide at least one of a voice service and a data service that has a data rate of less than or equal to a threshold, and
   the shared spectrum includes a remaining bandwidth after excluding the bandwidth included in the licensed spectrum.

3. The mobile system as claimed in claim 1, further comprising:
   a monitoring unit to monitor a control message from a base station system via the licensed spectrum each predetermined period while in a sleep mode; and
   a mode converter to convert the sleep mode to an awake mode based on the control message.

4. A base station system comprising:
a mobile system classifying unit to classify a mobile system depending on an available spectrum that is available in at least one of a licensed spectrum and a shared spectrum;
a spectrum allocating unit to allocate at least one of the licensed spectrum and the shared spectrum according to classification of the mobile system; and
a change message transmitter to determine whether to change the frequency band based on sensing information that is received from the mobile system via the at least one spectrum, and to transmit, to the mobile system, a change message for controlling the change in the frequency band of the shared spectrum based on the determination of whether to change the frequency band.

5. The base station system as claimed in claim 4, wherein the mobile system is classified into a mobile system that can use only the licensed spectrum and a mobile system that can use both the licensed spectrum and the shared spectrum.

6. The base station system as claimed in claim 4, further comprising:
a control message transmitter to transmit a control message via the licensed spectrum at a scheduled time in order to convert the mobile system from the sleep mode to the awake mode.

7. A mobile system comprising:
a reporting unit configured to report sensing information to a base station system via at least one of a licensed spectrum and a shared spectrum;
a control message receiver configured to receive a control message associated with a virtual base station system from the base station system via an allocated spectrum, the virtual base station system being configured to manage a subscriber through a central control apparatus connected to the base station system;
a spectrum selector configured to select at least one portion of the shared spectrum to be used for communication between the mobile system and the virtual base station system based on the control message that is received from the base station system; and
a data transceiver configured to transmit data to the virtual base station and receive data from the virtual base station via the selected spectrum,
wherein the mobile system is configured to allocate at least one of the licensed spectrum and the shared spectrum according to classification of the mobile system depending on an available spectrum that is available in at least one of licensed spectrum and the shared spectrum.

8. The mobile system as claimed in claim 7, wherein the control message includes at least one of an identifier of the virtual base station system and spectrum information.

9. The mobile system as claimed in claim 7, wherein the data transceiver comprises:
a synchronization unit to perform forward frame synchronization with the virtual base station system;
an initialization unit to receive a broadcast control message from the virtual base station system to perform initialization between the mobile system and the virtual base station system; and
an additional control message receiver to receive an additional control message via the selected portion of the shared spectrum.

10. The mobile system as claimed in claim 9, wherein the additional control message comprises at least one of control information for operation of the virtual base station system, control information for transmitting and receiving of data, and sensing information for spectrum management.

11. The mobile system as claimed in claim 7,
wherein the sensing information is used to secure a shared spectrum in the virtual base station system.

12. The mobile system as claimed in claim 7, wherein the selected portion of the shared spectrum is secured in the virtual base station system via a spectrum broker.

13. The base station system as claimed in claim 7, wherein the virtual base station uses an infrastructure of the base station system.

14. A base station system comprising:
a mobile system classifying unit to classify a mobile system depending on an available spectrum that is available in at least one of a licensed spectrum and a shared spectrum;
a spectrum allocating unit to allocate at least one of the licensed spectrum and the shared spectrum according to the classification of the mobile system; and
a control message transmitter configured to transmit control information, to the mobile system, for controlling change in frequency band of the shared spectrum based on a determination of whether to change the frequency band, wherein the control information includes spectrum information of an associated virtual base station system, the virtual base station system being configured to manage a subscriber through a central control apparatus connected to the base station system; and
a communication repeater comprising a data transceiver configured to relay data communication between the mobile system and the virtual base station system via a spectrum selected based on the spectrum information,
wherein the base station system determines whether to change the frequency band based on sensing information that is received from the mobile system via at least one spectrum.

15. The base station system as claimed in claim 14, wherein:
the control message further includes an identifier of the virtual base station system, and
the mobile system communicates with the virtual base station system corresponding to the identifier, based on the spectrum information.

16. The base station system as claimed in claim 14, wherein the selected spectrum is a shared spectrum.

17. A mobile communication device to support a communication service of a licensed spectrum and a communication service of a shared spectrum, the mobile communication device comprising:
an initialization unit configured to initialize transmitting and receiving of data using the shared spectrum;
a sensing unit configured to sense a spectrum for transmitting and receiving of the data via the shared spectrum;
a transceiver configured to transmit and receive the data via the sensed spectrum;
a sensing information reporting unit configured to report sensing information to a base station system via at least one of the licensed spectrum and the shared spectrum; and
a shared spectrum changing unit configured to change the frequency band of the shared spectrum based on a change message that is received from the base station system,
wherein the mobile device is configured to allocate at least one of the licensed spectrum and the shared spectrum according to classification of the mobile device depending on an available spectrum that is available in at least one of the licensed spectrum and the shared spectrum.

* * * * *